United States Patent

[11] 3,542,146

[72] Inventors Bernard Hooper
Stourbridge;
Robert Victor Trigg, Birmingham, England
[21] Appl. No. 734,339
[22] Filed June 4, 1968
[45] Patented Nov. 24, 1970
[73] Assignee Norton Villiers Limited
Wolverhampton, Staffordshire, England
a British company
[32] Priority June 8, 1967
[33] Great Britain
[31] No. 26,433/1967

[54] CHAIN DRIVEN VEHICLES
8 Claims, 12 Drawing Figs.
[52] U.S. Cl. .................................................... 180/33,
248/3; 180/64; 280/281
[51] Int. Cl. ...................................................... B60k 5/12
[50] Field of Search ......................................... 180/33,
33.(1), 32, 64; 248/3—10; 280/281

[56] References Cited

UNITED STATES PATENTS

| | | | |
|---|---|---|---|
| 1,912,270 | 5/1933 | Funk ............................ | 248/9 |
| 2,076,046 | 4/1937 | Schjolin ....................... | 248/9 |
| 2,743,783 | 5/1956 | Kreidler ....................... | 180/33 |
| 3,018,990 | 1/1962 | Muller .......................... | 248/9 |

FOREIGN PATENTS

| | | | |
|---|---|---|---|
| 598,754 | 2/1948 | Great Britain ............... | 180/33 |
| 552,411 | 12/1956 | Italy ............................ | 180/33 |
| 1,110,540 | 8/1957 | Germany ...................... | 180/32 |

*Primary Examiner*—Kenneth H. Betts
*Attorney*—Kurt Kelman

ABSTRACT: The disclosure describes motorcycles in which the rear road wheel is mounted in a fork swinging on the power unit and connected to springing means. The mounting of the power unit in the frame is such as to allow a greater amplitude of movement in directions radial of the rotary axis of the road wheel than directions parallel to said axis. The power unit is mounted on three resilient mountings located respectively at the apices of a triangle lying in a plane perpendicular to the rotary axis of the road wheel.

Patented Nov. 24, 1970

INVENTORS:
BERNARD HOOPER
ROBERT VICTOR TRIGG
BY Kurt Kelman
AGENT

Patented Nov. 24, 1970

INVENTORS:
BERNARD HOOPER
ROBERT VICTOR TRIGG
BY Kurt Kelman
AGENT

CHAIN DRIVEN VEHICLES

BACKGROUND OF THE INVENTION

1. Field of the Invention

The invention is concerned with chain-driven vehicles and particularly motorcylces i.e. all steerable, two-wheeled, power-driven vehicles.

2. Description of the Prior Art.

It has been proposed to mount the engine of a motorcycle resiliently in the frame thereof with a view to reducing the vibrations transmitted from the engine to the frame. It has been found, however, that with such resilient mounting, when the engine is under load it tends to twist about a vertical axis due to the chain pull. As a result, the distance between the engine and the driven wheel tends to shorten with a danger that the driving chain may become disengaged. Moreover, the engine mounting has to withstand the whole of the chain tension and has to be strong enough to avoid collapse but not so stiff as to give little attenuation of engine vibration. This problem has to some extent been solved by fitting between the engine and the frame one or more links which allow the engine some movement in a vertical plane but restrain the engine from twisting about a vertical axis, the links tending to restrain movement of the engine rearwardly which would shorten the distance between the engine and the driven wheel. However, even in this construction there is considerable vibration transmitted from the engine to the frame through the links.

It is normal motorcycle practice at present to mount the rear, driven wheel in a swinging fork which is pivoted at its forward end to the frame, carries the wheel between its rearwardly-extending limbs and is connected to the rear spring dampers which are also connected to the frame.

SUMMARY OF THE INVENTION

According to the invention we provide a chain-driven vehicle comprising a frame, a power unit, a fork pivotally mounted on the power unit a driving wheel rotatably mounted in the fork, a chain drive between the wheel and the power unit and resilient mounting means between the power unit and the frame, the resilient mounting means permitting movement of the power unit relative to the frame in first and second directions which are respectively radial of, and parallel to, the axis of rotation of said road wheel, the permitted amplitude of such movement in said first directions from a neutral position of the power unit in the frame being greater than the permitted amplitude of 3 such movement in said second directions.

Thus the permitted relative movement is greater in planes parallel to the plane of the driving wheel and lesser in planes perpendicular to the plane of said wheel, the plane of such wheel being the plane through the center of the wheel and perpendicular to the rotary axis thereof.

By virtue of the foregoing construction, the engine is allowed displacements while resiliently mounted in said first directions so that vibrations passed onto the frame are largely attenuated. Since the swinging fork is pivoted to the power unit rather than to the frame, the distance between the power unit and the driven wheel cannot alter under load so that there is no danger of the chain drive becoming disengaged. Moreover, any tendency of the power unit to pivot about a vertical axis relative to the wheel will be restrained by the pivotal connection between the fork and the power unit.

Preferably, the resilient mounting means comprise three spaced-apart, resilient mountings between the power unit and the frame and located at the apices of a triangle lying in the plane of the driving wheel. Preferably, at least one of said mountings is of a first kind and mounts the engine resiliently for said movement in said first directions and provides clearance for said movement in said second directions. The (or each) mounting of said first kind may comprise a shaft secured to the frame or the power unit, a tubular assembly surrounding the shaft and secured to the power unit or the frame, and resilient bushes interposed between the tubular assembly and the shaft and arranged so that said clearance allows the shaft and tubular assembly to move axially relative to each other.

Each resilient bush may be bonded to an inner metal sleeve which engages the shaft and to an outer metal sleeve which engages a mounting sleeve fixed to the power unit or the frame, the outer and mounting sleeves forming the tubular assembly. Alternatively, each resilient bush may be bonded to an inner metal sleeve only which engages the shaft and the bush may engage directly a mounting sleeve fixed to the power unit or frame and forming the tubular assembly.

In the foregoing constructions, there may be further resilient bushes mounted on the shaft and of lesser cross-sectional size than the first mentioned bushes so that there is clearance between said further bushes in the tubular assembly. These further bushes act to limit deflection of the power unit relative to the frame upon acceleration of the vehicle.

Preferably, also, at least one of the resilient mountings is of a second kind and mounts the engine resiliently for said movements in both said first and second directions, the compliance of said mounting being greater in said first directions than in said second directions. In other words, the deflection of the mounting for a given force is greater in said first directions than in said second directions.

The (or each) mounting of the second kind may comprise one or more resilient discs, the (or each) disc being arranged so that it is in compression in a direction perpendicular to its faces, said direction being parallel to said second directions, and has its opposite faces connected to the frame and power unit respectively so that the disc is in shear parallel to said faces during said movement in said second directions. By compressing the disc in the direction perpendicular to its faces the shear properties thereof are improved.

Two of the three resilient mountings may be of the first kind being arranged between the lower part of the power unit and the frame, the third resilient mounting being of the second kind and being mounted in between an upper part of the power unit and the frame.

The power unit may solely be an engine if no gearbox is provided or may be a unitary engine and gearbox. In another arrangement, the power unit may comprise a separate engine and gearbox, the latter being chain driven from the engine and the engine and gearbox being interconnected by mounting plates.

BRIEF DESCRIPTION OF THE DRAWING

Various embodiments of the invention will now be described in detail by way of example with reference to the accompanying drawings in which.

DESCRIPTION OF THE PREFERRED EMBODIMENTS

Referring first to FIGS. 1 to 5 inclusive, the motorcycle thereshown comprises a frame indicated generally at 1 and which is fully described and is claimed in application Ser. No. 734,312 now U.S. Pat. No. 3,508,765, filed June 4, 1968, by Bernard Hooper, Robert Victor Trigg and Stefan George Bauer, to which reference should be had. Briefly, the frame comprises a backbone 11 which at its forward end supports front forks 12 which in turn support a front road wheel 13. Mounted on the frame is an engine 14 which is connected to a gearbox 15 by a pair of mounting plates 16. Pivoted to the mounting plates 16 is a rear swinging fork 17 which carries the rear road or driving wheel 18. The wheel 18 is driven from the gearbox by a chain 19. The swinging fork is connected to suspension means 20 which in turn are connected to the frame 10.

Figure 1:
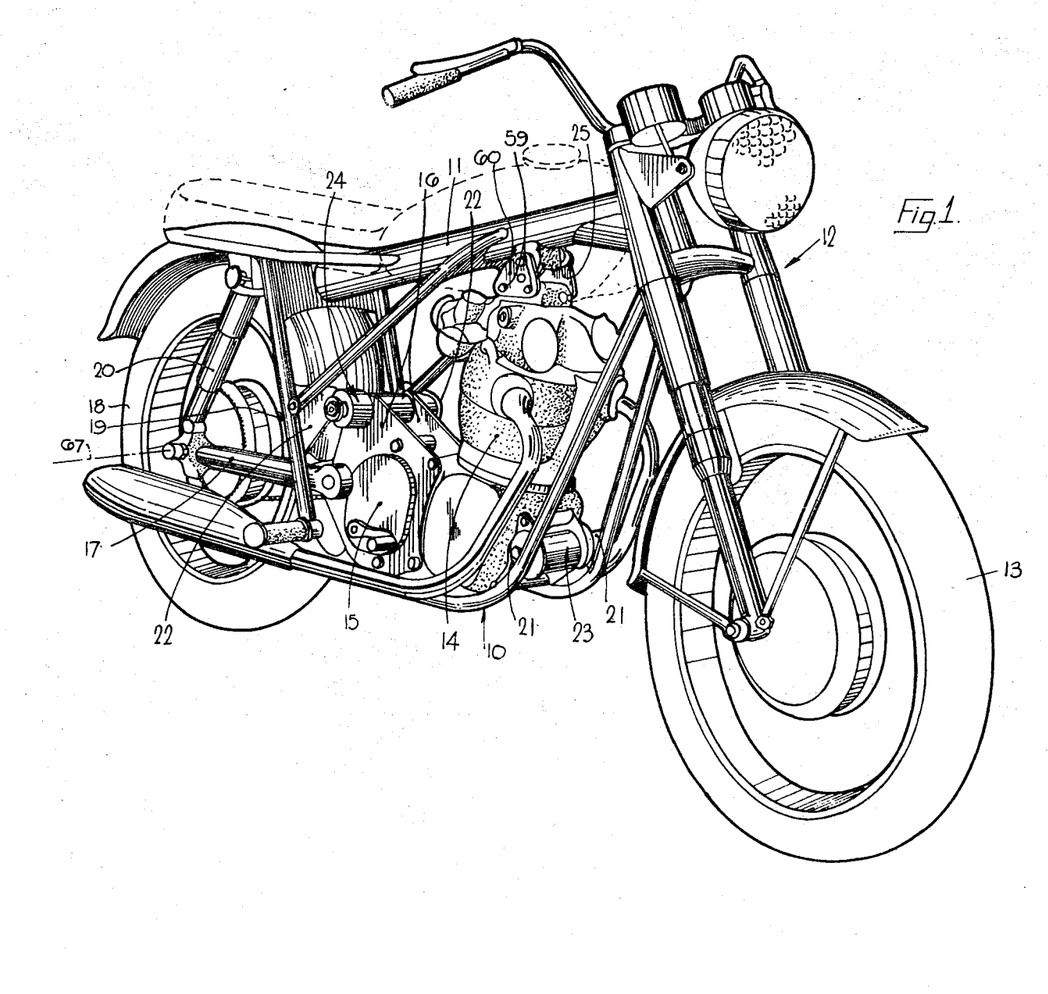
FIG. 1 is a perspective view of a motorcycle embodying the invention and using a separate engine and gearbox.

The frame 10 carries lower front engine mounting plates 21 and lower rear mounting plates 22. The power unit comprising the engine 14, the gear box 15 and the mounting plates 16 is mounted on the frame by a first resilient mounting 23 interposed between the lower front engine mounting plates 21 and the power unit, by a second resilient mounting 24 interposed between the power unit and the rear engine mounting plates and a third resilient mounting 25 interposed between the upper part of the engine and the backbone 11.

Figure 2:
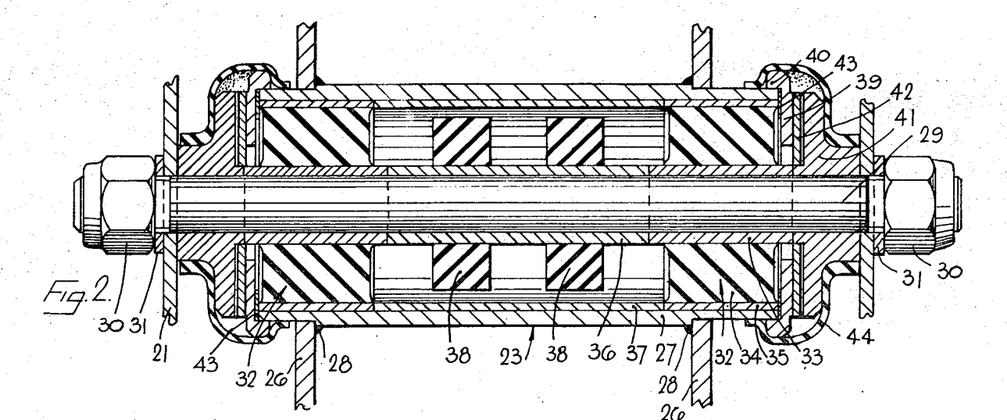
FIGS. 2 and 3 are vertical sections through the lower front and rear engine mountings of the motorcycle of FIG. 1.

Referring now to FIG. 2, this shows the first resilient mounting and it is interposed between the lower front engine mounting plates 21 and mounting plates 26 secured to the engine 14, the plates 26 being apertured and carrying a mounting sleeve 27 which is welded to the plates at 28. The lower front engine mounting plates 21 carry a shaft 29 which at its ends is provided with lock nuts 30 and washers 31. Engaging the shaft 29 are two resilient bushes of similar construction each indicated generally at 32 and each comprising an inner sleeve 33, a rubber annulus 34 and an outer sleeve 35, the annulus being bonded to the inner and outer sleeves 33 and 35 which are of metal. The inner sleeve 33 is a close fit on the shaft 29 and the outer sleeve 35 is a close fit in the mounting sleeve 27. The sleeves 33 are spaced by means of a spacer sleeve 36 and the sleeves 35 are spaced by a spacer sleeve 37. The spacer sleeve 36 carries two rubber annuli 38 which are of lesser diameter than the annuli 34 and which serve to limit deflection of the engine relative to the frame as will hereinafter be described.

At its ends, the mounting sleeve 27 carries inner thrust plates 39 which are formed with flanges 40 which overlie the ends of the mounting sleeve 27. The shaft also carries outer thrust plates 41 and between each pair of inner and outer thrust plates which constitute cooperating abutments, there is a polyurethane bearing or antifriction washer 42. Shims 43 are interposed between each end of the mounting sleeve 27 and the adjacent inner thrust plate 39. A gaiter 44 of flexible material is arranged at each end of the mounting and each gaiter 44 engages at its one end with the flange 40 and at its other end with a lower front engine mounting plate 21. The shims 43 are adjusted to give an end float of the shaft 29 relative to the mounting sleeve 27 which is between .005 inch and .010 inch.

Figure 3:
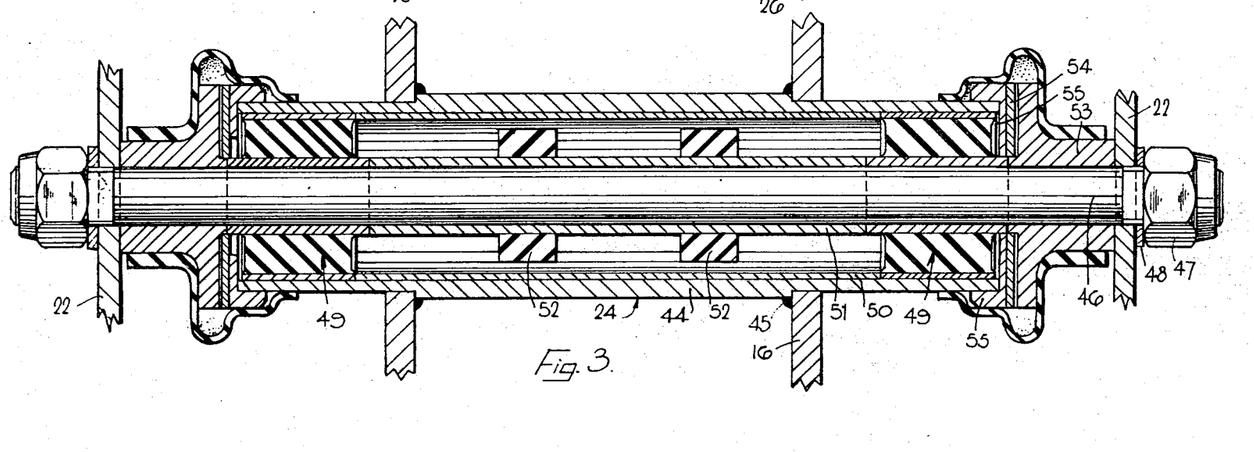

The rear resilient mounting 24 is similar, except in length, to the mounting 23. Thus the mounting plates 16 carry a mounting sleeve 44 which is welded to the plates 16 at 45 and a shaft 46 is secured to the rear mounting plates 22, the shaft carrying lock nuts and washers 47 and 48 at its ends.

The shaft 46 carries resilient bushes 49 which are similar in construction to the bushes 32, the bushes 49 being spaced by spacer sleeves 50 and 51. The sleeve 51 carries resilient bushes 52 similar to the bushes 38. The shaft 46 carries at its ends outer thrust plates 53, bearing or antifriction washers 54 and inner thrust plates 55 similar to the corresponding members 41, 42 and 39 in FIG. 2, the thrust plates 53 and 55 forming cooperating abutments. Shims 56 are placed between the inner thrust plates 55 and the ends of the mounting sleeve 44. As in FIG. 2, the shims 56 are adjusted so that the maximum end float of the shaft 46 relative to the mounting sleeve 44 is approximately 0.010 inch.

Figure 4:
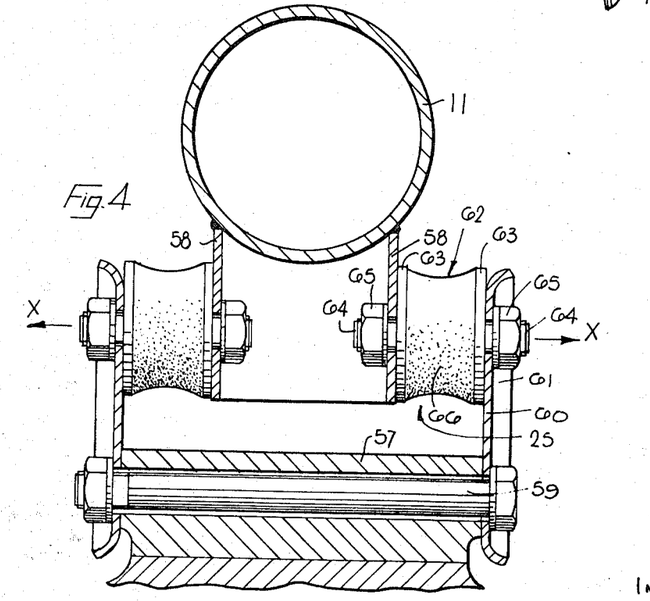
FIG. 4 is a vertical section through the upper engine mounting of the motorcycle of FIG. 1.

Referring now to FIG. 4, this shows the third resilient mounting 25. This mounting extends between a mounting bracket 57 secured to the cylinder head of the engine and two mounting plates 58 welded to the backbone 11 of the frame. Secured to the mounting bracket 57 by two bolts 59 are a pair of spaced generally triangular plates 60 clearly shown in FIG. 1, the plates 60 each having a peripheral flange 61 to give the plate rigidity. Between each plate 58 and its adjacent plate 60 is a resilient mounting bobbin 62 which comprises a pair of metal discs 63, each of which has a stud 64 welded thereto, the studs being engaged with the plates 58 and 63 respectively and held in position by nuts 65. Bonded to the faces of the discs 63 is a resilient disc of rubber or like material 66 and this is arranged to be in compression in directions perpendicular to its faces, i.e. in directions indicated by the arrows X and X.

The operation of the suspension of the power unit is as follows. Considering first the axis of the driven road wheel 18, which axis is indicated 67 in FIG. 1, the shafts 29 and 46 of the first and second resilient mountings 23 and 24 respectively are parallel to this axis and the directions X X in FIG. 4 are also parallel to this axis. It will be seen that the mountings 23, 24 and 25 are arranged at the apices of a triangle lying in a plane perpendicular to the axis 67. Movement of the power unit in all first directions radial to this axis 67 are controlled by the resilient bushes 32 and 49 in the first and second resilient mountings 23 and 24 being loaded in impression and by the resilient discs 66 in the third resilient mounting 25 being loaded in shear. The static deflection of the power unit from a neutral position, i.e. a position in which the shafts 29 and 46 are concentric with the mounting sleeves 27 and 44 may be of the order of 0.04 inch. The power unit will vibrate about this static deflected position and components of vibrations which are in directions radial to the axis 67 will be attenuated by the resilience of the bushes 32 and 49. During acceleration of the machine, a load is placed on the engine and the deflection may reach 0.1 inch and this deflection is limited by engagement of the resilient bushes 38 and 52 with the spacer sleeves 37 and 50 in the mountings 23 and 24.

Movement of the power unit in all directions parallel to the axis 67 is resisted by the bushes 32 and 49 being loaded in shear and the amplitude of such movement is limited by the end float which is left between the shafts 29 and 46 and their associated mounting sleeves 27 and 44 as described above. This end float is considerably less than the amplitude of deflection allowed in directions radial of the axis 67. Thus by way of example the maximum end float may be of the order of 0.01 inch as described above but the maximum deflection of the power unit from a neutral position in directions radial of the axis may be 0.1 inch.

Turning now to the operation of the third resilient mounting 25, the compression of the disc 66 and the arrangement of the bobbins 62 is such that the mounting has a greater compliance in direction perpendicular to the directions X X in FIG. 4, i.e. in directions radial of the axis 67 than it does in the directions X X, i.e. directions parallel to the axis 67. The discs are thus loaded in shear by movement of the power unit in all directions radial to the axis 67 and are loaded in compression by all such movements parallel to the axis.

Figure 5:
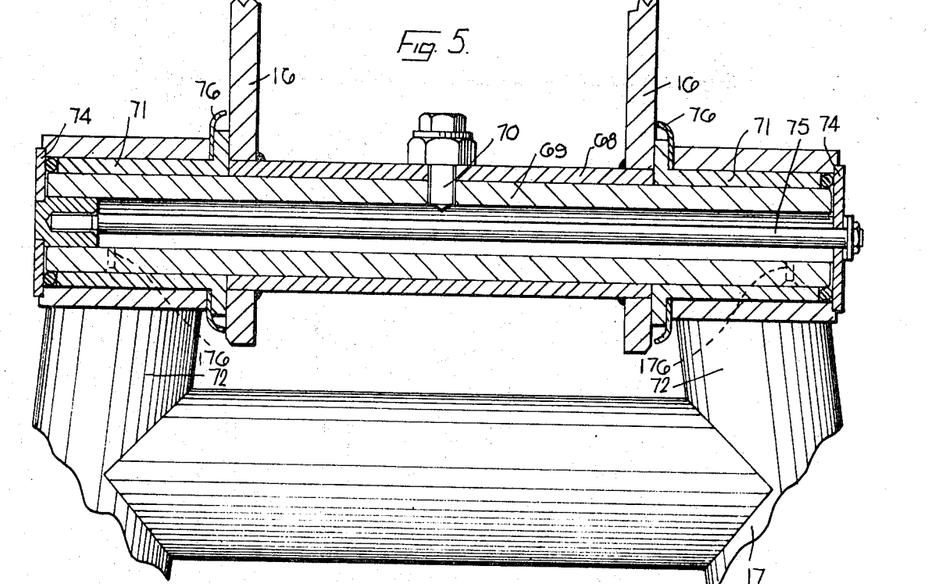
FIG. 5 is a horizontal section through the pivot mounting of a the swinging rear fork of the motorcycle of FIG. 1.

The swinging fork 17 is mounted on the plates 16 in the manner shown in FIG. 5. The plates 16 have a sleeve 68 welded between them, the sleeve receiving a shaft 69 which is held in position by a set pin 70. The ends of the shaft are received in flanged bushes 71 which are received in the ends 72 of the limbs of the fork, the bushes being shielded by end plates 74 which are clamped together by a pin 75. A protective washer 76 protects the flange of each bush 71. The shaft 69 is provided with oil holes 176 so that the bearings between the shaft and the bushes 71 can be oiled by removing one of the end plates 74 and introducing oil into the bore of the shaft 69 which is hollow.

It will be noted that the swinging fork is pivoted to the power unit comprising the engine 14, the gearbox 15 and the mounting plates 16 so that there is no possibility of the distance between the rear road wheel 18 and the gearbox changing during acceleration and deceleration. We have found that by the combination of mounting the swinging fork on the power unit and by using resilient mountings between the power unit and the frame located as described and constructed such that the amplitude of permitted movement of the power unit is greater in directions radial of the axis 67 than in directions parallel thereto we have obtained a suspension which effectively attenuates engine vibration without bringing in its train disadvantages in the drive to the rear wheel 18 or allowing rear wheel steering to occur under load.

Figure 6:
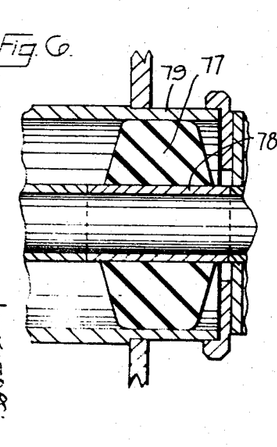
FIG. 6 is a detailed section of a modification applicable to the mountings of FIGS. 2 and 3.

Figure 6 shows a modification which is applicable to the mountings 23 and 24 in that instead of using resilient bushings such as 32 and 49 having metal sleeves 35 bonded to the rubber annuli, a resilient bush 77 is bonded to an inner metal sleeve 78 but frictionally engages directly a mounting sleeve 79 similar to the mounting sleeve 27 or 44. The frictional engagement is sufficient for the bush to be loaded in shear by relative movements of the power unit and frame parallel to the axis 67. Otherwise the construction of the mountings is the same as described in relation to FIGS. 2 and 3.

Referring now to FIGS. 7 to 10, this shows an arrangement which is basically similar to that described with relation to FIGS. 1 to 6 except that the power unit comprises a unitary engine and gearbox and thus the lower mountings are made to the engine casing rather than to plates and the swinging fork is also pivoted to the engine casing.

Figure 7:
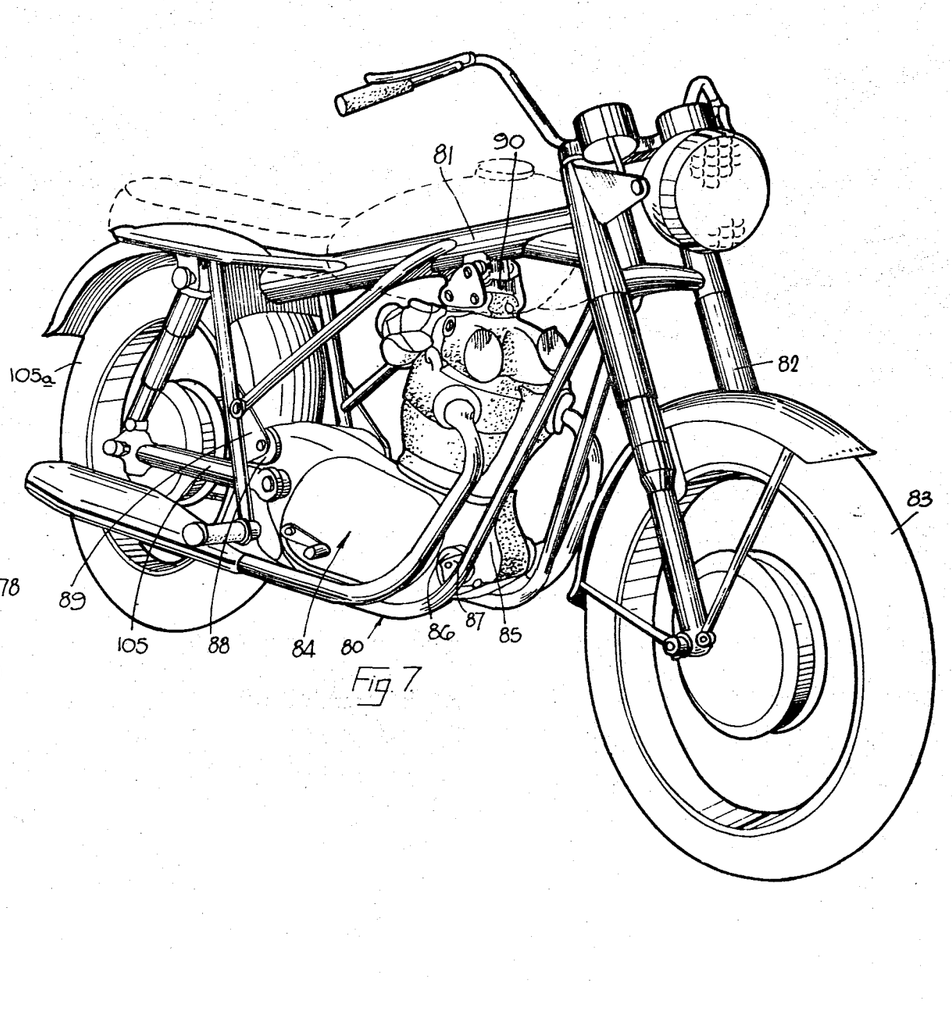
FIG. 7 is a perspective view of a motorcycle constituting a further embodiment of the invention and using a unitary engine and gearbox.

Referring first to FIG. 7, the motor cycle frame is indicated generally at 80 and has a backbone 81 which carries forks 82 which in turn carry a front road wheel 83. Mounted in the frame is a power unit indicated generally at 84 which comprises a unitary engine and gearbox. The power unit has a casing 85 and is mounted in the frame by a resilient mounting 86 interposed between the casing 85 and lower front engine mounting plates 87, a second resilient mounting 88 interposed between the casing 85 and rear mounting plates 89 and a third resilient mounting 90 interposed between the cylinder head of the engine and the backbone 81.

The first and second mountings 86 and 88 will be described in relation to FIGS. 8 and 9 but the third resilient mounting 90 is exactly as shown in FIG. 4 and will not be described further.

Figure 8:
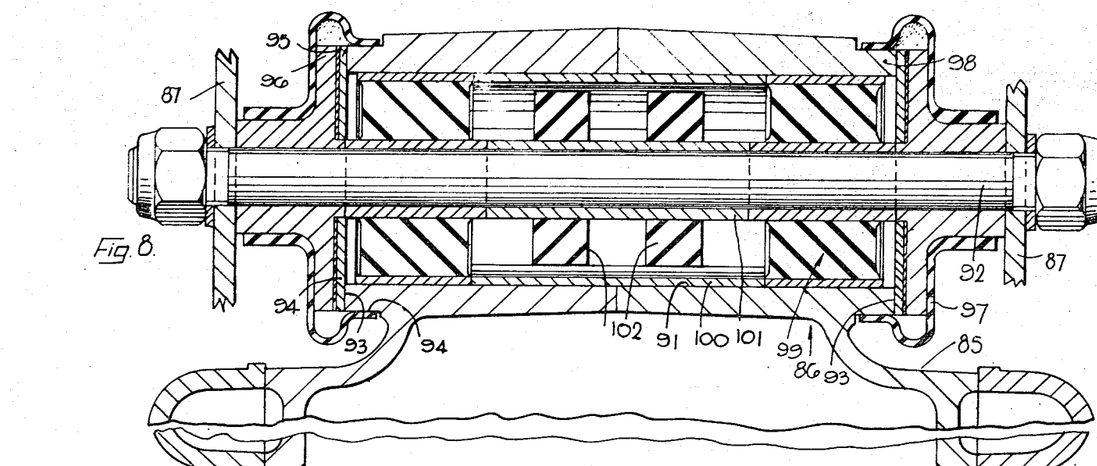
FIGS. 8 and 9 are horizontal sections through the lower front and rear engine mountings to the motorcycle of FIG. 7.

Referring to first to FIG. 8, the casing 85 of the engine is provided with a bore 91 which provides a mounting sleeve for the resilient mounting. Within the bore 91 is mounted a shaft 92 which is connected at its ends to the plates 87. The casing 85 is provided, at the ends of the bore 91, with faces 93 which are engaged by shims 95 and the latter by outer thrust plates 96. Flexible gaiters 97 extends between the outer thrust plates and spigots 98 and on the casing 85. The shims 95 are adjusted to provide the desired end float between the shaft 92 and the casing 85, such end float not exceeding 0.01 inch normally.

Mounted on the shaft 92 are two resilient bushes 99 of the same general construction as the bushes 32 of FIG. 2, the bushes 99 being spaced by spacing sleeves 100 and 101 and the spacing sleeve 101 carrying resilient bushes 102 of construction similar to the bushes 38.

Figure 9:
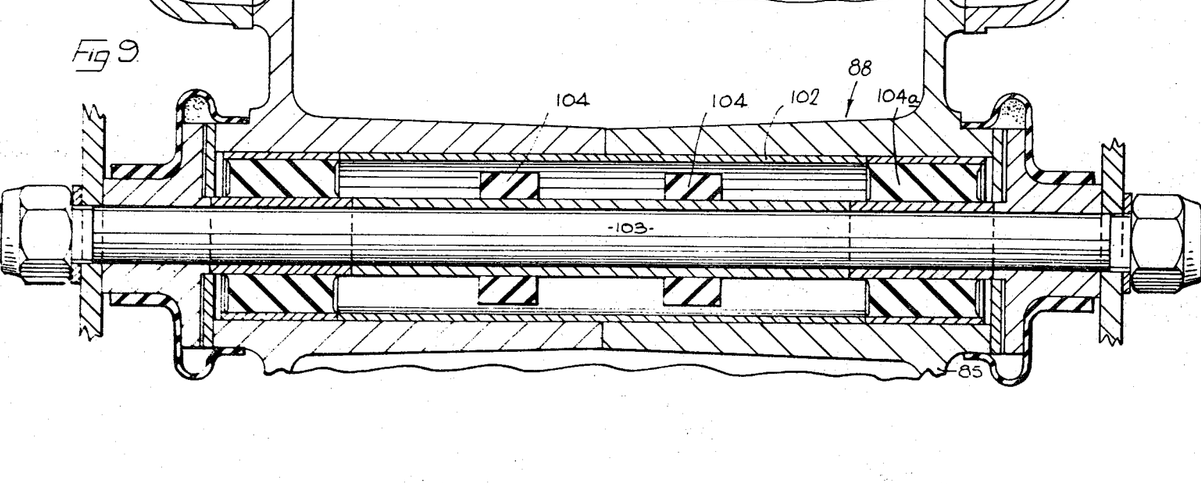

FIG. 9 shown the second resilient mounting 88 and it will not be described in detail because it is virtually identical with the mounting 86 except that the bore 102 in the casing 85 is longer than the bore 91 and the shaft 103 is appropriately longer than the shaft 92. The resilient mounting comprises bushes 104a similar to the bushes 99 and further bushes 104 to limit deflection of the power unit in a manner described in relation to FIGS. 2 and 3.

The power unit casing 85 carries a swinging fork indicated generally at 105 which carries the rear road wheel 105a and the pivotal mounting of a swinging fork is similar to that described in relation to FIG. 5 except that the fork is mounted directly on the casing 85. Thus the casing is formed with a bore 106 which receives a hollow shaft 107 located by a set pin 108. At the ends of the bore 106 there are provided faces 109 which are engaged by bearing washers 110 which are interposed between the faces and pivot bushes 111 received in the limbs 112 of the fork 105. The bushes are shielded by end plates 112 clamped together by a pin 113 and sealed by O-rings 114.

Figure 10:
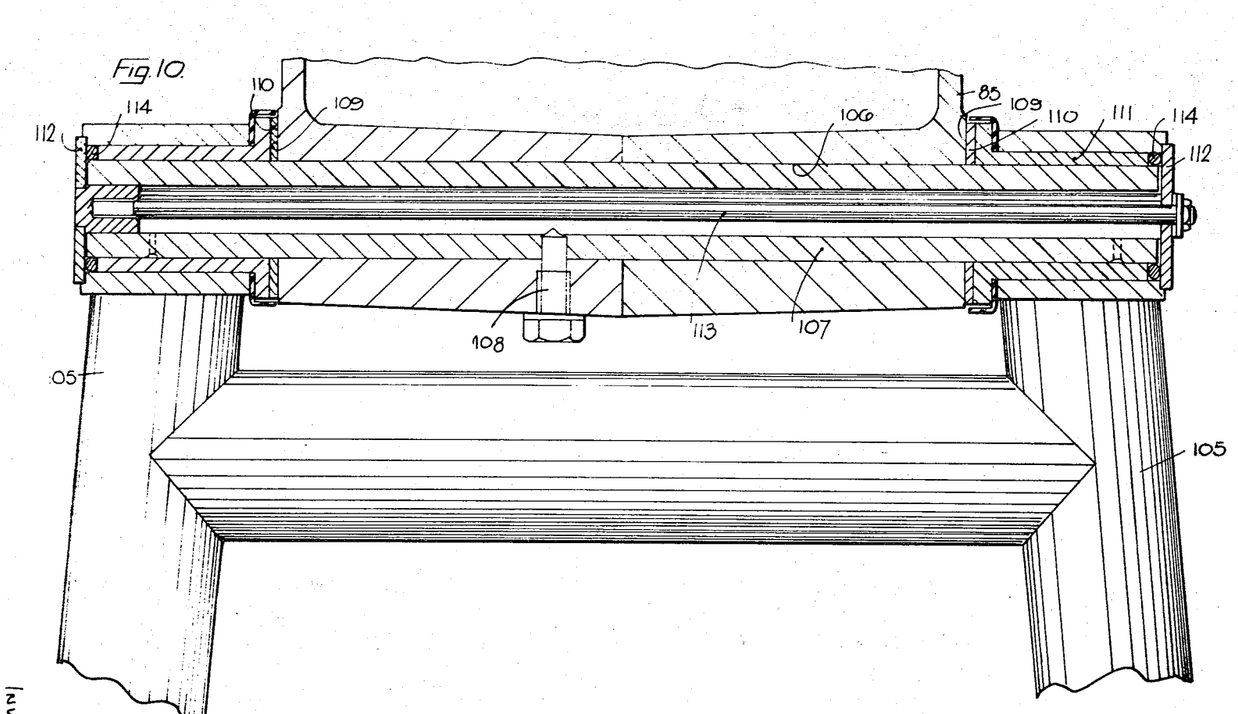
FIG. 10 is a horizontal section through the pivot mounting of the rear swinging fork of the motorcycle of FIG. 7.

The operation of the arrangement described in relation to FIGS. 7 and 10 is identical to the operation of the arrangement described in relation to FIGS. 1 to 6 but in FIGS. 7 to 10 there is a unitary construction having the casing 85 which is formed with the bores to receive the mountings 86 and 88 and the pivotal mounting of the swinging fork 105.

Figure 11:
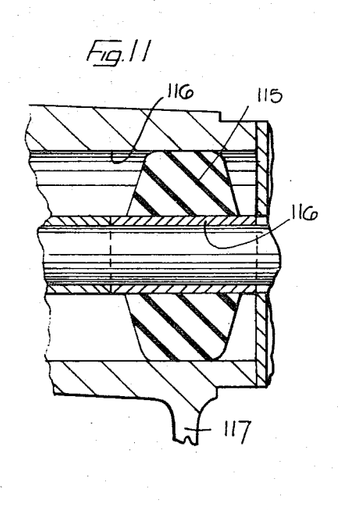
FIG. 11 is a detailed section of a modification applicable to the mountings of FIGS. 8 and 9.

FIG. 11 shows an alternative form of resilient bush applicable to the mountings 86 and 88 and comprising a resilient bush 115 bonded to a metal sleeve 116 but frictionally engaging directly a bore 116 in a casing 117.

Figure 12:
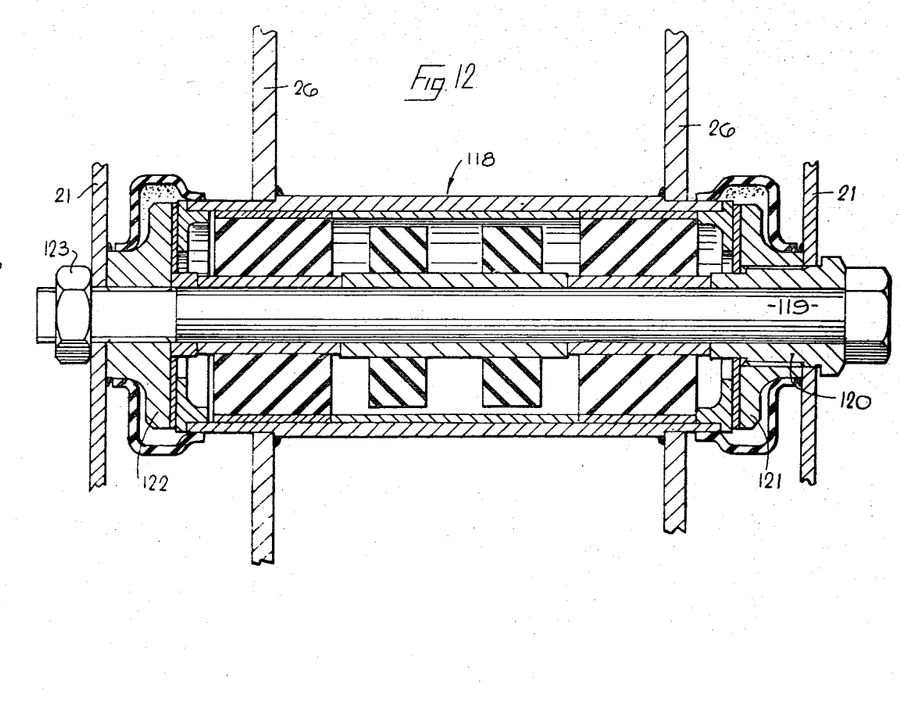
FIG. 12 is a detail section applicable to the mountings of FIGS. 2, 3 and 8, 9.

FIG. 12 shows an alternative means of providing adjustment of the end float. The construction is applicable to the mountings shown in FIGS. 2, 3, 8 and 9 but is described in relation to the first resilient mounting shown in FIG. 2. Thus, a mounting 118 is interposed between the lower front engine mounting plates 21 and mounting plates 26. The shaft 29 is FIG. 2 is replaced by a bolt 119 which carries, at its head end, an adjusting sleeve 120 which is received in an outer thrust plate 121 fixed to one mounting plate 21. The other end of the bolt 119 is threadedly received in the other outer thrust plate 122, fixed to the other mounting plate 21, and carries a lock nut 123. The end float may therefore be adjusted by means of the bolt 119 and sleeve 120, therebeing no need for shims 43. The construction of the rest of the mounting is similar to that described in connection with FIG. 2 and will not be discussed further.

We Claim:

1. A chain driven vehicle comprising a frame, a power unit movably mounted on the frame but having a neutral position relative thereto, a fork pivotally mounted on the power unit, a driving wheel rotatably mounted in the fork, a chain drive connecting the driving wheel to the power unit, and three mountings between the power unit and the frame, the mountings being located respectively at the apices of a triangle lying in a plane perpendicular to the axis of rotation of the driving wheel, two of the mountings comprising a first rigid mounting element fixed to the power unit, a second rigid mounting element fixed to the frame and a mass of resilient material so located between said elements that by movements of the power unit relative to the frame in all first directions radial to said axis the material is loaded in the same one manner of the two manners shear and compression, and so that by such movements in all second directions parallel to said axis the material is loaded in the other of said two manners, the mountings controlling the amplitude of such movement so that the permitted amplitude of the movement from said position in said first directions is a number of times greater than the permitted amplitude of the movement from said position in said second directions.

2. A vehicle according to claim 1 wherein in at least one of said mountings said mass is located so that the material is loaded in compression during said movements in said first directions, the mounting including cooperating abutments on the mounting elements and which which positively limit relative movement of the elements in said second directions.

3. A vehicle according to claim 2 in which the first element of said one mounting includes a shaft secured to one of the frame and the power unit, the second element includes a tubular assembly secured to the other of the frame and the power unit and said mass is in the form of bush means engaging the shaft and the tubular assembly, the mounting including antifriction washers between the cooperating abutments.

4. A vehicle according to claim 3 wherein the bush means is bonded to inner metal sleeve means which engages the shaft and to outer metal sleeve means which engages a mounting sleeve fixed to, or forming part of, the power unit or frame, the outer and mounting sleeves forming the tubular assembly.

5. A vehicle according to claim 3 wherein the resilient bush means is bonded to an inner metal sleeve which engages the shaft, the bush means engaging directly a mounting sleeve fixed to, or forming part of, the power unit or frame and forming the tubular assembly.

6. A vehicle according to claim 3 wherein said one mounting includes further resilient bush means mounted on the shaft and of lesser cross-sectional size than the first mentioned bush means so that there is clearance between said further bush means and the tubular assembly.

7. A vehicle according to claim 1 wherein at least one of said mountings said mass comprises one or more resilient discs, the or each disc being arranged so that it is compression in a direction perpendicular to its faces, said direction being parallel to said second direction, and has its opposite faces connected to the frame and power unit respectively so that the disc is in shear parallel to said faces during said movement in said first direction.

8. A vehicle according to claim 1 wherein the power unit comprises a separate engine and gearbox, the latter being chain-driven from the engine, the engine and the gearbox being interconnected by mounting plates.